US012591677B2

(12) United States Patent
Jaiswal et al.

(10) Patent No.: US 12,591,677 B2
(45) Date of Patent: Mar. 31, 2026

(54) SYSTEM AND METHOD FOR DETECTION AND ON-DEMAND DISINFECTION OF REMOTE DEVICES

(71) Applicant: Vehere Interactive Pvt Ltd, Kolkata (IN)

(72) Inventors: Naveen Jaiswal, Kolkata (IN); Winny M. Thomas, Bangalore (IN)

(73) Assignee: Vehere Technologies Private Limited, Kolkata (IN)

( * ) Notice: Subject to any disclaimer, the term of this patent is extended or adjusted under 35 U.S.C. 154(b) by 72 days.

(21) Appl. No.: 18/613,030

(22) Filed: Mar. 21, 2024

(65) Prior Publication Data

US 2025/0036767 A1 Jan. 30, 2025

(30) Foreign Application Priority Data

Jul. 27, 2023 (IN) ............................ 202331050707

(51) Int. Cl.
*G06F 21/56* (2013.01)
*G06F 9/455* (2018.01)

(52) U.S. Cl.
CPC ........ *G06F 21/568* (2013.01); *G06F 9/45558* (2013.01); *G06F 21/565* (2013.01); *G06F 2009/45587* (2013.01)

(58) Field of Classification Search
CPC .. G06F 21/568; G06F 9/45558; G06F 21/565; G06F 2009/45587; G06F 21/566
See application file for complete search history.

(56) References Cited

U.S. PATENT DOCUMENTS

| | | | | |
|---|---|---|---|---|
| 9,916,443 | B1 * | 3/2018 | Qu | G06F 21/566 |
| 10,462,173 | B1 * | 10/2019 | Aziz | H04L 63/1433 |
| 10,482,239 | B1 * | 11/2019 | Liu | G06F 21/563 |
| 2015/0256552 | A1 * | 9/2015 | Lee | G06F 21/554 726/24 |
| 2015/0356291 | A1 * | 12/2015 | Zakorzhevsky | G06F 21/566 726/24 |
| 2016/0021142 | A1 * | 1/2016 | Gafni | G06F 9/45558 726/23 |
| 2016/0321453 | A1 * | 11/2016 | Yang | G06F 21/562 |
| 2017/0083703 | A1 * | 3/2017 | Abbasi | G06F 21/561 |
| 2017/0103202 | A1 * | 4/2017 | Kim | G06F 21/564 |
| 2017/0214704 | A1 * | 7/2017 | Yang | G06F 21/566 |

(Continued)

FOREIGN PATENT DOCUMENTS

WO WO-2024193804 A1 * 9/2024 .......... G06F 21/567

*Primary Examiner* — Javier O Guzman
(74) *Attorney, Agent, or Firm* — Kolisch Hartwell, P.C.

(57) ABSTRACT

Embodiments of the present invention discloses a system and method for detection and on-demand disinfection of remote machines. The system comprises a computing device, a communication device, and a VM controller. The VM controller is configured for evaluating if the executable file sample received has been analyzed before. The VM controller script module is further configured for running a virtual machine (VM) to check status of the executable file sample. The VM controller is further configured for activating a driver register. The VM controller is further configured for generating a file sample analysis report based on the series of events. The VM controller is further configured for classifying the executable file sample based on the series of events and the file sample analysis report.

22 Claims, 7 Drawing Sheets

(SYSTEM)

(56) References Cited

U.S. PATENT DOCUMENTS

| | | | | |
|---|---|---|---|---|
| 2022/0035920 | A1* | 2/2022 | Thomas | G06F 21/566 |
| 2023/0004639 | A1* | 1/2023 | Idrizovic | G06F 21/566 |
| 2023/0222215 | A1* | 7/2023 | Sevcenko | G06F 21/53<br>726/23 |
| 2023/0409715 | A1* | 12/2023 | Nissim | G06F 9/45533 |
| 2024/0111864 | A1* | 4/2024 | Ševcenko | G06F 21/566 |
| 2024/0311479 | A1* | 9/2024 | Yan | G06F 21/52 |

* cited by examiner

FIG. 1 (SYSTEM)

SYSTEM AND METHOD FOR DETECTION AND ON-DEMAND DISINFECTION OF REMOTE DEVICES

TECHNICAL FIELD

Embodiments of the present invention generally relates to device security systems and methods. Particularly, embodiments of the present invention relates to a remote security systems. More particularly, embodiments of the present invention relates to a system and method for detection and on-demand disinfection of remote devices over a remote internal network.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Antivirus software is a security program designed to prevent, detect, search, and remove viruses and other types of malware from computers, networks, and other devices. Often included as a part of a security package, the antivirus software can also be purchased as a standalone option. Typically installed on a computer as a proactive approach to cybersecurity, an antivirus program can help mitigate a variety of cyber threats, including keyloggers, browser hijackers, Trojan horses, worms, rootkits, spyware, adware, botnets, phishing attempts and ransomware attacks. The malware is a code that can harm the computers and laptops, and the data on them. User devices can become infected by inadvertently downloading malware that's in an attachment linked to a dubious email, or hidden on a Universal Serial Bus (USB) drive, or even by simply visiting a dodgy files or links. Once the malware is on any computing machine like a personal computer (PC) or a laptop, the malware steals user data, encrypt it so that the user cannot access it, or even erase it completely. In order to prevent this, the user uses the antivirus software, and keep it up to date to protect their data and devices Even if corporate personal computers (PCs) have antivirus applications, computers are not 100% protected against possible malware infections from directly connected data storage devices. Such situations may arise, for example, when a user of a corporate PC has not updated antivirus databases of the antivirus software for a long time, and unbeknownst to the user connected to the PC a Flash drive containing a new type of malware, which may not be detected by the antivirus application using outdated antivirus databases. This malware may spread to other PCs in the corporate network causing significant damage or loss of information. There are many other scenarios in which oversight or inexperience of PC users can cause malware infections.

Currently, there have been many traditional systems developed in the recent past to perform the treatment of infections in the computing machine. One of the systems is a server-side system that detects and classifies malware and other types of undesirable processes and events operating on network connected devices, through the analysis of information collected from said network connected devices. The system receives information over a network connection and collects information that is identified as being anomalous. The collected information is analyzed by system process that can group data based on optimally suited cluster analysis methods. Upon clustering the information, the system can correlate an anomalous event to device status, interaction, and various elements that constitute environmental data in order to identify a pattern of behaviour associated with a known or unknown strain of malware. The system further interprets the clustered information to extrapolate propagation characteristics of the strain of malware and determine a potential response action. However, there are numerous significant challenges inherent with the traditional server-side systems. Firstly, by the time the potential response action for the malware is determined, the computers of a company or organization gets infected by the malware and it becomes late for the company to realize that the malware has entered other computer systems. Second, after the action is determined the file which is suspected of having the malware is sent to the research lab, where the cause of the infection is identified and a fix is provided. But during this time window the sample would have caused significant damage or loss of business. Moreover, the traditional server-side systems are more time consuming.

Another example of the traditional system as described above is an antivirus engine installed in the personal computer to detect and clean the malware which has entered the personal computer or any other computing machine. The antivirus (AV) engine is configured to generate on-spot an antidote that runs on the PC to check if the PC is infected. However, the drawback of using the antivirus engine that the antivirus engine is only able to disinfect the machine if the virus or threat is known. Moreover, the AV engine takes a lot of time to clean the malware, as the malware causes significant damage to the personal computer or any other computing machines by the time any solution is determined by the AV engine.

Accordingly, in view of the above mentioned drawbacks in the recently developed malware cleaning systems, there is a need for an improved, automated, efficient, accurate, less time-consuming, on-demand, and easy to use malware detection and disinfection system and method which solves the aforementioned drawbacks, by extracting behavioural aspects of the malware and classify the malware under a specific category and perform disinfection, using a multi-model approach.

OBJECTS AND FEATURES OF THE INVENTION

Accordingly, several objects and advantages of present invention are to provide a system and a method for detection and on-demand disinfection of remote machines. It is a further object and feature of the present invention to provide the system configured to analyze multiple file samples in a virtualized environment, using a multi-model approach. It is another object and feature of the present invention to provide the system which is configured to determine nature of the analyzed file sample based on a proprietary classifier, using the multi-model approach. The system uses the multi-model approach for making execution of the process of the detection and the on-demand disinfection of the remote machines significantly faster and easier. It is still a further object and feature of the present invention to provide the system which is configured to collect enough evidence with respect to the file sample, to understand the malicious nature of the file sample under analysis. The machine or remote machines which receive the malicious file sample are remotely scanned for signs of infection and upon detecting if the machine or the remote machines are infected, the machine or the remote machines are cleaned by instantly scanning the machine or the remote machines in order to fix the machine or the remote machines. Another object of the present invention is to provide the system for performing dynamic analysis of the file sample to extract behavioural aspects of the executable file sample, using the multi-model approach. It is a further object and feature of the present invention to provide the system for determining classification of the file sample upon the dynamic analysis of the file sample, using the multi-model approach. Another object and feature of the present invention is to provide the system for classifying the file sample as malicious in nature. If it is detected that the file sample is malicious in nature, the machine or the remote machines are scanned over a remote internal network based on the file sample analysis report, to detect signs of infection in the machine or the remote machines due to the executable file sample. Further objects and features of the present invention will become apparent from a consideration of the drawings and ensuing description.

SUMMARY OF THE INVENTION

Embodiments of present disclosure are generally directed to a computer-implemented system for detection and on-demand disinfection of remote devices. The remote devices herein refers to virtual devices, physical devices, remote network devices, or any other devices. In an example embodiment, the system mainly comprises of a computing device, a communication device, and a virtual machine (VM) controller. The computing device is configured to receive an executable file sample. The computing device is further configured to be in communication with the computing device. The communication device is configured to extract the executable file sample from the computing device. The VM controller is coupled to the computing device, the communication device and one or more processors. The one or more processors comprises a set of instruction stored within the processor. These instructions are executed by the one or more processors and causes the one or more processors to enable operational steps to be performed by the VM controller.

In one example embodiment, the operational steps comprises evaluating, through the communication device, if the executable file sample received has been analyzed before. The operational steps further comprises running a virtual machine to check status of the executable file sample. The operational steps further comprises activating a driver register to enable a file monitor to monitor a series of events occurring on the virtual machine, due to running of the virtual machine. The operational steps further comprises generating, through a file sample analysis generator, a file sample analysis report based on the series of events. The operational steps further comprises classifying, through an event classifier, the executable file sample based on the series of events and the file sample analysis report, after the file sample analysis report is generated.

In another example embodiment, if the executable file sample is classified as malicious in nature, a scanner is activated to scan the computing device or the remote devices over a remote internal network based on the file sample analysis report, to detect signs of infection in the computing device or the remote devices due to the executable file sample, and further check on conditions related with the computing device or the remote devices. The scanner is configured to check if the computing device or the remote devices have registry modifications, or if the computing devices or the remote devices have the executable file sample in their respective file subsystems.

In yet another example embodiment thereof, the VM controller is configured to upload the executable file sample onto the virtual machine.

In some example embodiments, the scanner is configured to ingest the file sample analysis report, and perform remote scanning of the remote machines over the remote internal network, to detect signs of the events recorded in the file sample analysis report. The scanner is further configured to optionally disinfect the remote machines by reversing sequence of the series of events seen in the file sample analysis report, if the infections in the remote machines does not involve a ransomware.

Certain embodiments of the present disclosure are directed to a computer-implemented method of performing detection and on-demand disinfection of the remote machines by the VM controller. The computer-implemented method comprises the operational steps performed by the VM controller and executed by the one or more processors. The operational steps comprises evaluating, through the communication device, if the executable file sample received has been analyzed before, as a first step. The operational steps further comprises running a virtual machine to check status of the executable file sample, as a second step. The operational steps further comprises activating a driver register to enable a file monitor to monitor a series of events occurring on the virtual machine, due to running of the virtual machine, as a third step. The operational steps further comprises generating, through a file sample analysis generator, a file sample analysis report based on the series of events, as a fourth step. The operational steps further comprises classifying, through an event classifier, the executable file sample based on the series of events and the file sample analysis report, after the file sample analysis report is generated, as a fifth step.

In some embodiments, the operational steps further comprises classifying the executable file sample as malicious in nature. The operational steps further comprises activating the scanner to scan the computing device or the remote devices over the remote internal network based on the file sample analysis report, upon classification of the executable file samples of malicious nature, and detect signs of the infection in the computing device or the remote devices due to the executable file sample, and further check on conditions related with the computing device or the remote devices.

These and other embodiments can each optionally include one or more of the following features: the operational step of activating, through the VM controller, the driver register for enabling the file monitor to monitor the series of events occurring on the virtual machine, due to running of the virtual machine comprises registering, through the driver register, a series of kernel callbacks to enable the file monitor to monitor the series of events. Further, the operational step of activating the scanner to scan the computing device or the remote devices over the remote internal network based on the file sample analysis report comprises firstly uploading, through the VM controller, the executable file sample onto the virtual machine for analysis, and secondly upon completion of analysis timeout, causing the virtual machine to shut down. Further, the operational step of scanning, through the scanner, the computing device or the remote devices over the remote internal network to detect the signs of infection in the computing device or the remote devices due to the executable file sample comprises firstly ingesting, through the scanner, the file sample analysis report, and secondly performing, through the scanner, remote scanning of the computing device or the remote devices over the remote internal network, to detect signs of the events recorded in the file sample analysis report. Further, the operational step of generating, through the file sample analysis generator, the file sample analysis report comprises downloading, through the file sample analysis generator, the file sample analysis report, before the virtual machine is shut down by the VM controller upon completion of the analysis timeout.

The present disclosure also provides a non-transitory computer-readable storage medium coupled to the one or more processors and having instructions stored thereon which, when executed by the one or more processors, cause the one or more processors to perform operations in accordance with implementations of the methods provided herein.

It is appreciated that the systems and methods in accordance with the present disclosure can include any combination of the aspects and features described herein. That is, the systems and methods in accordance with the present disclosure are not limited to the combinations of aspects and features specifically described herein, but also include any combination of the aspects and features provided. The details of one or more implementations of the present disclosure are set forth in the accompanying drawings and the description below. Other features and advantages of the present disclosure will be apparent from the description and drawings, and from the claims.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and the detailed description are to be regarded as illustrative in nature and not as restrictive.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION OF THE INVENTION

Figure 1:
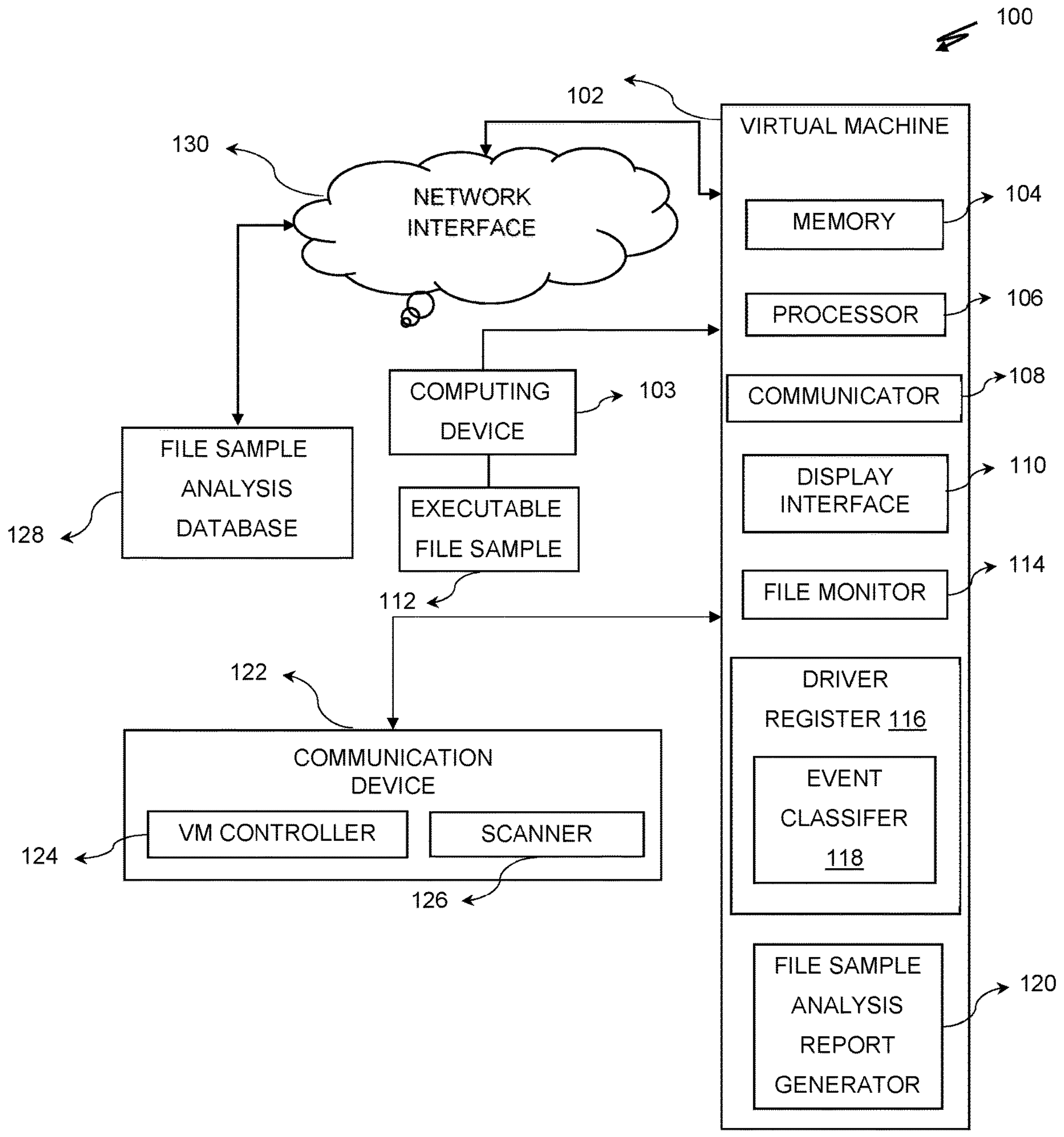
FIG. 1 depicts a system for detection and on-demand disinfection of remote devices using a multi-model approach, in accordance with one embodiment of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, and referring to the Figures, exemplary embodiments of the subject technology comprise a system and a method for detection and on-demand disinfection of remote devices. As will be appreciated, features of the system and the method provide various modes of operation of the system and the method while carrying out the detection and the on-demand disinfection of the remote devices.

Reference will now be made in detail to specific embodiments or features, examples of which are illustrated in the accompanying drawings. Wherever possible, corresponding or similar reference numerals will be used throughout the drawings to refer to the same or corresponding parts. Moreover, references to various elements described herein, are made individually or collectively when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

A phrase such as an “aspect” does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an “embodiment” does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. Furthermore, to the extent that the term "include," "have," or the like is used in the description or the claims, such term is intended to be inclusive in a manner similar to the term "comprise" as "comprise" is interpreted when employed as a transitional word in a claim.

Embodiments of the present disclosure are generally directed to a computer-implemented system for the detection and the on-demand disinfection of the remote devices. More particularly, the embodiments of the present disclosure are directed to performing certain actions involved in carrying out the detection and the on-demand disinfection of the remote devices, thereby extracting behavioural aspects of an executable file sample and detecting infections in the remote devices caused due to the executable file sample. In some embodiments, the actions include evaluating if the executable file sample received has been analyzed before. The action further include running a virtual machine to check status of the executable file sample. The action further include activating a driver register to enable a file monitor to monitor a series of events occurring on the virtual machine, due to running of the virtual machine. The action further include generating a file sample analysis report based on the series of events. The action further include classifying the executable file sample based on the series of events and the file sample analysis report, after generating of the file sample analysis report. The action further include scanning the computing device or the remote device over a remote internal network based on the file sample analysis report, to detect signs of infection in the computing device or the remote devices due to the executable file sample.

FIG. 1 depicts a system 100 for the detection and the on-demand disinfection of the remote devices using a multi-model approach, in accordance with one embodiment of the present disclosure. The system 100 comprises functional or logical components including a virtual machine 102, a computing device 103, an executable file sample 112, and a communication device 122. The virtual machine 102 comprises of a memory 104, a processor 106, a communicator 108, a display interface 110, a file monitor 114, a driver register 116, and a file sample analysis report generator 120. The communication device 122 comprises of a VM controller 124 and a scanner 126. The virtual machine 102 is configured to be run by the VM controller 124 of the communication device 122. The virtual machine 102 is further configured to check status of the executable file sample 112. The virtual machine 102 is further configured to be communicably coupled with the communication device 122, to receive the executable file sample 112 in order to check the status of the executable file sample 112. The virtual machine 102 is further configured to be activated by the VM controller 124, to receive the executable file sample 112 for uploading. The virtual machine 102 is further configured to be shut down by the VM controller 124, after analysis timeout with respect to the executable file sample 112 is completed.

In an embodiment, the virtual machine 102 is for example, but not restricted to, a physical machine, a remote network machine, or any other machine.

The computing device 103 is configured to receive the executable file sample 112. The computing device 103 is further configured to get infected, if it is detected that the executable file sample 112 received by the computing device 103 is malicious in nature. The computing device 103 is computing device 103 is further configured to receive data related to the executable file sample 112. The computing device 103 is further configured to process the data related to the executable file sample 112, through the processor 106. The computing device 103 is further configured to store the data related to the executable file sample 112, through the memory 104.

In an embodiment, the computing device 103 is for example, but not limited to, a laptop, a personal computer, a personal digital assistant (PDA), a tablet computer, a laptop, a cellular phone, a mobile device, an Internet of Things (IoT) device, a smart watch, a Virtual Reality (VR) device, a multiple camera system, or any other handheld device.

The memory 104 is configured to store the data related to the executable file sample 112. The memory 104 is further configured to store data related to the information embedded inside the executable file sample 112. The memory 104 is further configured to store data related with particulars of the executable file sample 112. These particulars include, but not limited to, a machine code, a source code, a program code, or the like.

In one embodiment, the memory 104 is configured to store instructions to be executed by the processor 106. The memory 104 is basically a virtual machine memory which may include a read-only memory (ROM) and random access memory. The memory 104 may be implemented as in DRAM (Dynamic RAM), electrically programmable memories (EPROM), electrically erasable and programmable memories (EEPROM), Flash, or other type of memory architecture. ROM may store a basic input/output system (BIOS), containing the basic routines that help to transfer information between the components of the system 100, such as during start-up. RAM stores operating system (OS), such as Windows® XP or other type of operating system, that is responsible for management and coordination of processes and allocation and sharing of hardware resources in the system 100. The memory 104 also stores applications and programs, such as an antivirus application, such as Kaspersky Antivirus, Kaspersky Antivirus of for Windows workstations, Kaspersky Antivirus for Linux workstations, McAfee Antivirus, Norton Antivirus or similar products. The memory 104 also stores various runtime data used by programs.

The processor 106 is coupled with the memory 104, the communicator 108, and the display interface 110. The processor 106 is configured to process the data related to the executable file sample 112. The processor 106 is further configured to process the data related to the information embedded inside the executable file sample 112. The processor 106 is further configured to process the data related with the particulars of the executable file sample 112.

The communicator 108 is configured to communicate with the computing device 103, by sending the data related to the executable file sample 112. The communicator 108 is further configured to communicate with the computing device 103, by sending the data related to the information embedded inside the executable file sample 112. The communicator 108 is further configured to communicate with the computing device 103, by sending the data related with the particulars of the executable file sample 112.

The display interface 110 is configured to display to the user through the computing device 104, the data related to the executable file sample 112 after the analysis of the executable file sample 112 is over. The display interface 110 is configured to display to the user through the computing device 104, the data related to the information embedded inside the executable file sample 112 after the analysis of the executable file sample 112 is over. The display interface 110 is configured to display to the user through the computing device 104, the data related with the particulars of the executable file sample 112 after the analysis of the executable file sample 112 is over.

The executable file sample 112 is a file sample configured to be received by the computing device 103. The executable file sample 112 is further configured to be analyzed in a virtualized environment. The executable file sample 112 is further configured to be dynamically analyzed, in order to extract behavioural aspects of the executable file sample 112. The executable file sample 112 is further configured to be executed within the computing device 103 in order to extract and analyze the particulars of the executable file sample 112.

The file monitor 114 is configured to be activated by the driver register 116 to monitor a series of events occurring on the virtual machine 102, due to running of the executable file sample 112. The series of events comprises of a process activity, a registry activity, a filesystem activity, a task scheduling activity, and network related activities.

The driver register 116 is configured to collect and monitor all events related with the executable file sample 112. The driver register 116 is further configured to send all the events related with the executable file sample 112 to an event classifier 118. The driver register 116 is further configured to register a series of kernel callbacks to enable the file monitor 114 to monitor the series of events. The driver register 116 is further configured to analyze the series of events to understand nature of each of the series of events. The driver register 116 is further configured to analyze nature of parameters passed to application program interface (API) calls. The driver register 116 is further configured to analyze nature of the event classifier 118.

In one example embodiment, the driver register 116 is further configured to keep a track record of all the events from the executable file sample 112 in a file sample analysis report.

The event classifier 118 is configured to receive each of the series of events related with the executable file sample 112, from the driver register 116. The event classifier 118 is further configured to classify the executable file sample as malicious, suspicious, or clean, based on each of the series of events related with the executable file sample 112. The event classifier 118 is further configured to monitor incoming events received by the driver register 116. The event classifier 118 is further configured to initiate classification process by assuming that the executable file sample 112 is clean.

In one example embodiment, if at least one event is seen as a high severity event, the executable file sample 112 is immediately classified as "MALICIOUS". If there are no high severity events seen, but there are two or more suspicious events seen, the executable file sample 112 is classified as "SUSPICIOUS". If there are no events seen, the executable file sample 112 is automatically marked as "CLEAN".

In another example embodiment, if the executable file sample 112 is classified as "MALICIOUS", the file sample analysis report containing a list of all the events related with the executable file sample 112 is generated.

The file sample analysis report generator 120 is configured to generate a file sample analysis report containing the record of each of the series of events, identified with respect to the executable file sample 112 after the analysis of the executable file sample 112 is over. The file sample analysis report generator 120 includes, but not limited to, record of the process activity, record of the registry activity, record of the filesystem activity, and record of the network related activities. The file sample analysis report generator 120 is further configured to be used by the scanner to generate the file sample analysis report, upon scanning of the remote devices in order to detect the signs of the infection in the remote devices due to the executable file sample 112.

The communication device 122 is basically a communication server which is configured to extract the executable file sample 112 from the computing device 103. The communication device 122 is further configured to activate the VM controller 124. The communication device 122 is further configured to analyze the executable file sample 112, upon receiving the executable file sample 112 by the computing device 103.

The VM controller 124 is configured to be in communication with the virtual machine 102 and the communication device 122. The VM controller 124 is further configured to activate the virtual machine 102 and the driver register 116. The VM controller 124 is further configured to upload the executable file sample 112 onto the virtual machine 102. The VM controller 124 is further configured to download the file sample analysis report and shut down the virtual machine 102, upon completion of analysis timeout.

In one example embodiment, the VM controller 124 is, but not limited to, a series of python scripts that receive the executable file sample 112 from the system 100, or a network detection and response system (NDR). The VM controller 124 is configured to initiate starting of the virtual machine 102. The VM controller 124 is further configured to ensure that every time the virtual machine 102 is started for a new analysis, the computing device 103 or other devices come up in a clean state. The clean state is stored as a snapshot of a windows version without any trace of a malware.

The scanner 126 is configured to scan the computing device 103 or the remote devices, to detect the signs of infection in the computing device 103 or the remote devices. The scanner 126 is further configured to perform on-spot scanning of the computing device 103 or the remote devices over a remote internal network, to detect the signs of infection in the computing device 103 or the remote devices due to the executable file sample 112. The scanner 126 is further configured to scan the computing device 103 or the remote devices based on the generated file sample analysis report. The scanner 126 is further configured to check on conditions related with the computing device 103 or the remote devices.

In one example embodiment, the scanner 126 is further configured to check if the computing device 103 or the remote devices have registry modifications, or if the computing device 103 or the remote devices have the executable file sample 112 in their respective file subsystems.

In another example embodiment, the scanner 126 is further configured to ingest the file sample analysis report, and perform remote scanning of the other machines over the remote internal network to detect signs of the events recorded in the file sample analysis report.

In yet another example embodiment, the scanner 126 is further configured to optionally disinfect the remote machines by reversing sequence of the series of events seen in the file sample analysis report, if the infection in the other machines does not involve a ransomware.

In yet another example embodiment, the scanner 126 is further configured to remove newly added registry keys, delete dropped files, terminate processes created by the executable file sample 112 or more than one executable file sample, shut down network services started by the executable file sample 112, and remove scheduled tasks and associated files.

A file sample analysis database 128 or also referred herein as a database 128 is a storage entity which is configured to store data records related with the executable file sample 112. The file sample analysis database 128 is further configured to store data records related with the information embedded inside the executable file sample 112. The file sample analysis database 128 is further configured to store data records related with the particulars of the executable file sample 112. The file sample analysis database 128 is further configured to store data records related with the list of each of the series of events related to the executable file sample 112.

In an embodiment, the virtual machine 102, the computing device 103, the communication device 122, and the file sample analysis database 128 are all connected to each other over a network interface 130.

The network interface 130 may facilitate a communication link among the components of the system 100. It can be noted that the network interface 130 may be wired and/or a wireless network. The network interface 130, if wireless, may be implemented using communication techniques like Visible Light Communication (VLC), Wireless Local Area Network (WLAN), Infrared (IR) Communication, Public Switched Telephone Network (PSTN), Radio Waves, and other communication techniques know in the art.

the network interface 130 can be accessed over a wired and/or a wireless communications link. For example, mobile computing devices, like smartphones can utilize a cellular network to access the network interface 130.

Figure 2:
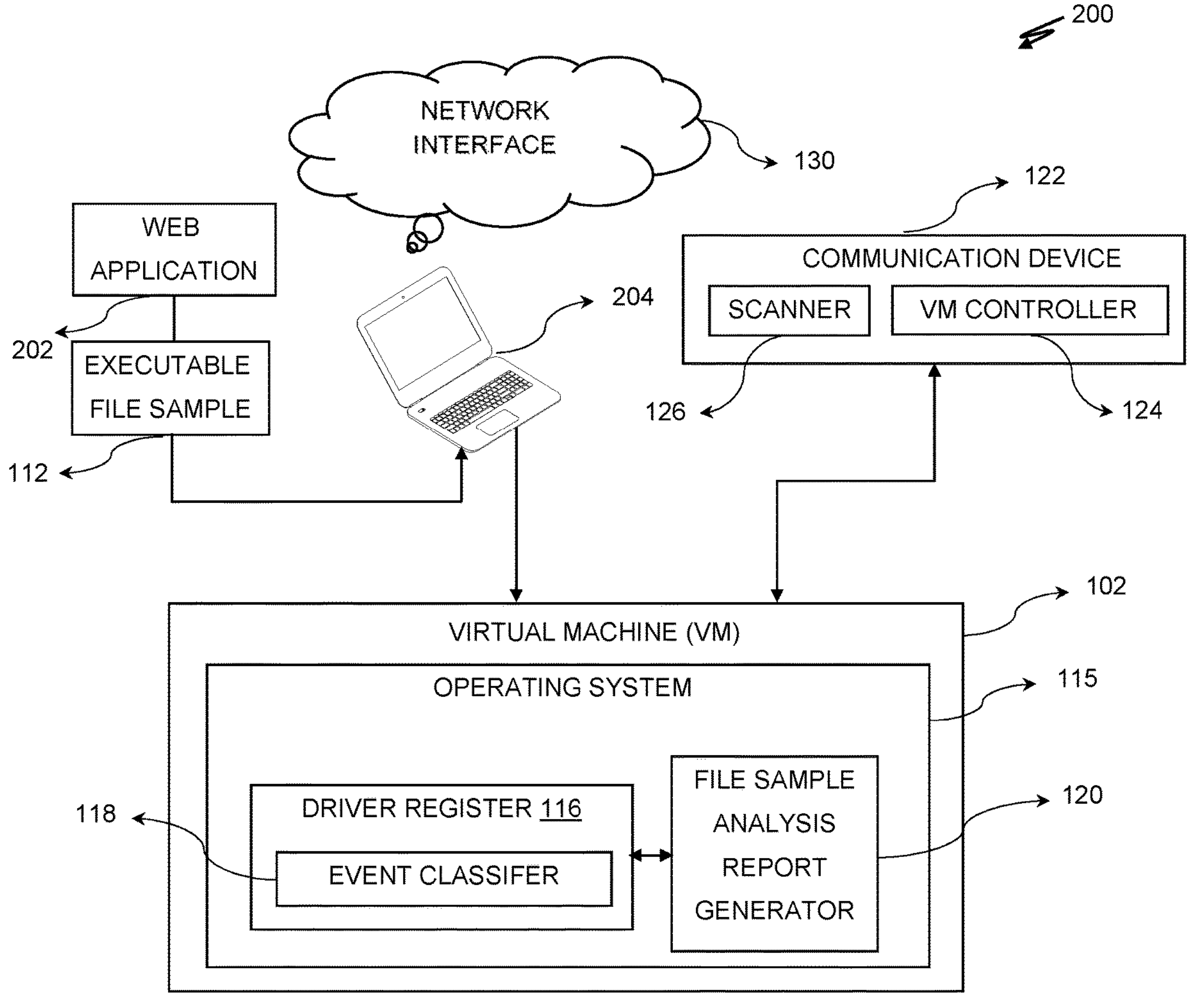
FIG. 2 depicts a system for the detection and the on-demand disinfection of a remote device, in accordance with one exemplary embodiment of the present disclosure.

FIG. 2 depicts a system 200 for the detection and the on-demand disinfection of a remote device, in accordance with one exemplary embodiment of the present disclosure. The system 200 mainly comprises of the virtual machine 102, the communication device 122, a web application 202, and a computing device 204. The computing device 204 is configured to receive the executable file sample 112 through the web application 202. The executable file sample 112 is configured to be received by the communication device 122. The virtual machine 102 is activated by the communication device 122 to analyze the executable file sample 112. The VM controller 124 is configured to be communicably coupled with the virtual machine 102 and the communication device 122. The VM controller 124 is further configured to collect and monitor each of the series of events related with the executable file sample 112, through the driver register 116. The VM controller 124 is further configured to send each of the series of events related with the executable file sample 112 to the event classifier 118, through the driver register 116. The event classifier 118 upon receiving the executable file sample 112 is configured to classify the executable file sample 112, based on each of the series of events related with the executable file sample 112. If the executable file sample 112 is classified under "MALICIOUS" category, the file sample analysis report generator 120 generates the file sample analysis report of each of the series of events related with the executable file sample 112. The file sample analysis report is stored within an operating system 115 which manages each of the series of events listed in the file sample analysis report. Based on the generated file sample analysis report, the scanner 126 scans the computing device 204 or the remote devices as per the case or user requirements. During scanning of the computing device 204 or the remote devices over the remote internal network, the signs of infections are detected in the computing device 204 or the remote devices due to the executable file sample 112. A further check on the conditions related with the computing device 204 or the remote devices is carried out by checking, if the computing device 204 or the remote devices have registry modifications, or if the computing device 204 or the remote devices have the executable file sample 112 in their respective file subsystems.

In one example embodiment, the web application 115 is, but not limited to, a software application, a website, a web link, or any other application based link. The file subsystems refer to data management systems or file management systems.

Figure 3:
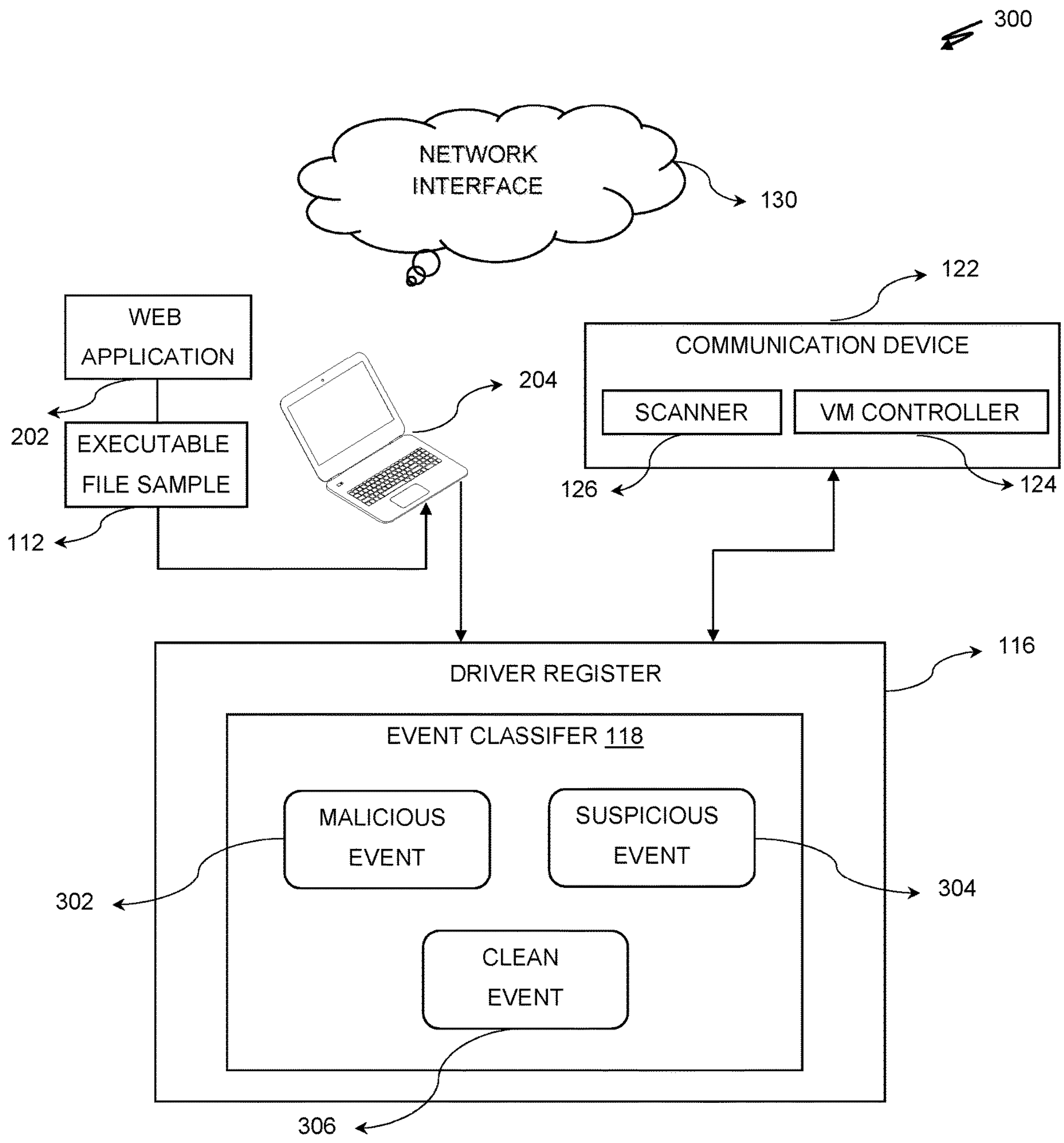
FIG. 3 depicts a system for the detection and the on-demand disinfection of the remote device, in accordance with another exemplary embodiment of the present disclosure.

FIG. 3 depicts a system 300 for the detection and the on-demand disinfection of the remote device, in accordance with another exemplary embodiment of the present disclosure. The system 300 mainly comprises of the communication device 122, the VM controller 124, the scanner 126, and the computing device 204. The VM controller 124 is communicably coupled with the virtual machine 102 and the communication device 122, and configured for collecting and monitoring each of the series of events related with the executable file sample 112, through the driver register 116. The VM controller 124 is further configured for sending each of the series of events related with the executable file sample 112 to the event classifier 118, through the driver register 116. The event classifier 118 upon receiving the executable file sample 112 is configured to classify the executable file sample 112. The executable file sample 112 is classified into three different categories of events namely: a "MALICIOUS" event 302, a "SUSPICIOUS" event 304, and a "CLEAN" event 306. The "MALICIOUS" event 302 is an event classification which is applicable if at least one event is seen as a high severity event. The "SUSPICIOUS" event 304 is the event classification which is applicable if no high severity events are seen, but there two or more suspicious events are seen. The "CLEAN" event 306 is the event classification if no events are seen.

Figure 4:
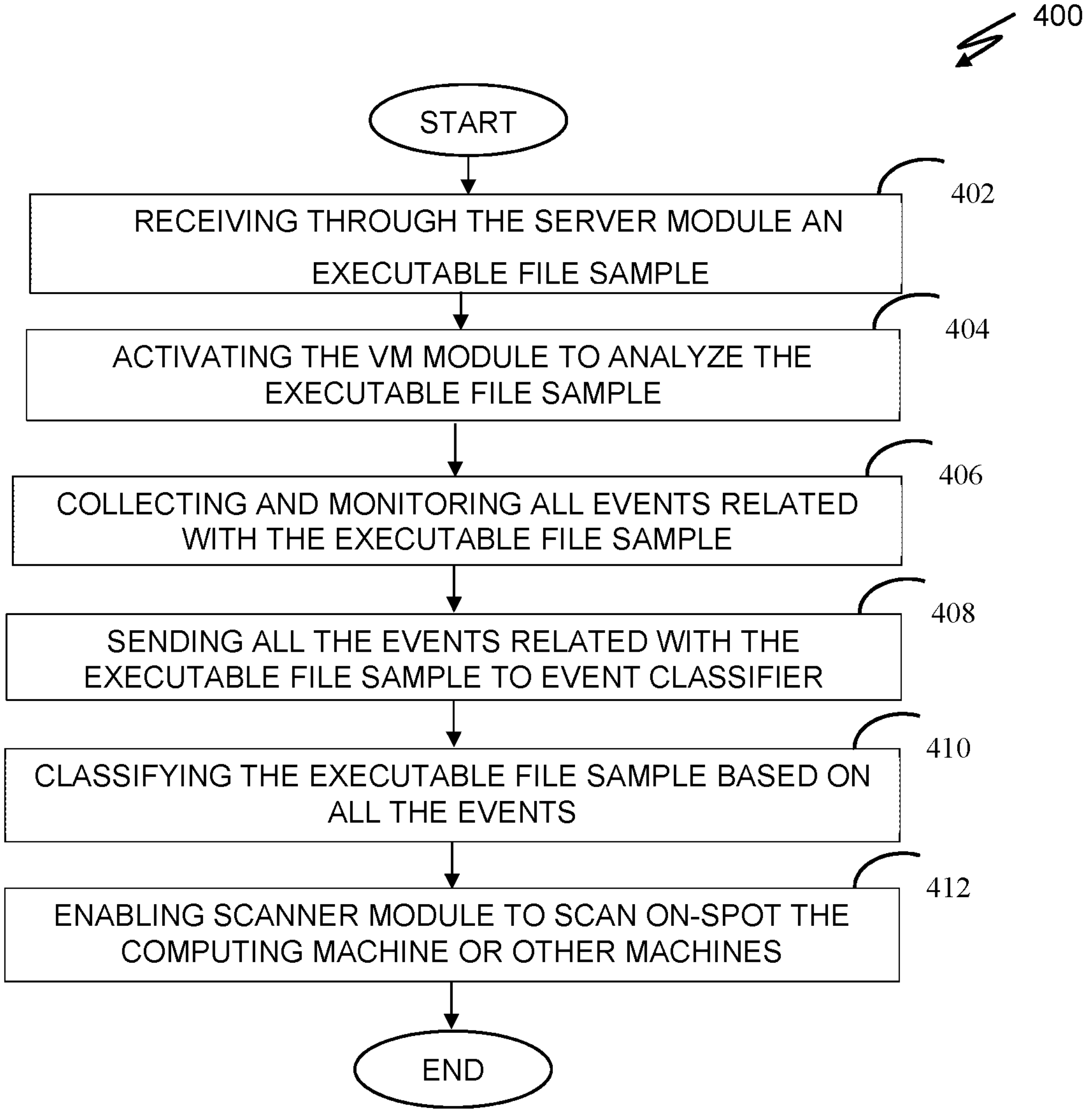
FIG. 4 depicts a method for the detection and the on-demand disinfection of the remote devices, in accordance with one embodiment of the present disclosure.

FIG. 4 depicts a method 400 for the detection and the on-demand disinfection of the remote devices, in accordance with one embodiment of the present disclosure. The method 400 starts initially at step 402 and ends at step 412. At step 402, the method 400 initially comprises receiving the executable file sample 112, through the computing device 103. For instance, the computing device 103 like a personal computer used by the user receives the executable file sample 112 from the website, or the email link or through a storage device. At step 404, the method 400 further comprises extracting, through the communication device 122, the executable file sample 112 from the computing device 103. For instance, the executable file sample 112 received through the website, or the email link, or the storage device is received by the communication device 122 from the computing device 103. At step 406, the method 400 further comprises evaluating, through the communication device 122, that if the executable file sample 112 received has been analyzed before or not. For instance, the communication device 122 evaluates that if the received executable file sample 112 is analyzed before or not in the past. If it is evaluated by the communication device 122 that the received executable file sample is not analyzed, after that at step 408, the method 400 further comprises analyzing, through the communication device 122, the executable file sample 112. At step 410, the method 400 further comprises running, through the VM controller 124, the virtual machine 102 to check status of the executable file sample 112. For instance, the executable file sample 112 received from the website, or the email link or through the storage device is checked for any issues if present, by the virtual machine 102 which is run using the VM controller 124. At step 412, the method 400 further comprises activating, through the VM controller 124, the driver register 116 for enabling the file monitor 114 to monitor the series of events occurring on the virtual machine 102, due to the running of the executable file sample 112. For instance, if there are any issues found in the executable file sample 112 received through the website, or the email link or through the storage device, the driver register 116 is activated by the VM controller 124 and the driver register 116 once activated enables the file monitor to monitor the series of events occurring on the virtual machine 102, due to the issues detected in the executable file sample 112. At step 414, the method 400 further comprises generating, through the file sample analysis generator 120, the file sample analysis report based on the series of events. For instance, the file sample analysis report is generated by the file sample analysis generator 120 which contains records related with analysis of the executable file sample 112. These records are basically the data related with the series of events which have occurred on the virtual machine due to the issues detected in the executable file sample 112. Lastly, at step 416 as a final step, the method 400 further comprises classifying, through the event classifier 118, the executable file sample 112 based on the series of events and the file sample analysis report. For instance, the event classifier 118 classifies the executable file sample 112 received through the website, or the email link or through the storage device as "MALICIOUS", if the series of events detected are serious and the file sample analysis report represents serious threats captured during the analysis.

In an example embodiment, if the executable file sample 112 is classified as "MALICIOUS" in nature, the scanner 126 is activated to scan the computing device 103 or the remote devices over the remote internal network based on the file sample analysis report, to detect the signs of the infection in the computing device 103 or the remote devices due to the executable file sample 112, and further check on the conditions related with the computing device 103 or the remote devices.

In one example embodiment, the step of further check on the conditions related with the computing device 103 or the remote devices comprises checking, by the scanner 126, if the computing device 103 or the remote devices have registry modifications or if the computing device 103 or the remote devices have the executable file sample 112 in their respective file subsystems.

In another example embodiment, the step 412 of activating, through the VM controller 124, the driver register 116 for enabling the file monitor 114 to monitor the series of events occurring on the virtual machine 102, due to the running of the executable file sample 112 comprises registering, through the driver register 116, the series of kernel callbacks to enable the file monitor 114 to monitor the series of events.

In yet another example embodiment, the step 412 of activating, through the VM controller 124, the driver register 116 for enabling the file monitor 114 to monitor the series of events occurring on the virtual machine 102, due to the running of the executable file sample 112 further comprises analyzing, through the driver register 116, the series of events to understand the nature of each of the series of events, the nature of parameters passed to the API calls, and the nature of the event classifier 118.

In yet another example embodiment, the method 400 illustrated in FIG. 4 further comprises storing, through the driver register 116, the record of each of the series of events from the executable file sample 112 in the file sample analysis report.

The step of activating the scanner 126 to scan the computing device 103 or the remote devices based on the file sample analysis report comprises firstly uploading, through the VM controller 124, the executable file sample 112 onto the virtual machine 102, and secondly upon completion of the analysis timeout, causing the virtual machine 102 to shut down.

The step of scanning, through the scanner 126, the computing device 103 or the remote devices over the remote internal network to detect the signs of the infection in the computing device 103 or the remote devices due to the executable file sample 112 comprises firstly ingesting, through the scanner 126, the file sample analysis report, and secondly performing, through the scanner 126, remote scanning of the computing device 103 or the remote devices over the remote internal network, to detect the signs of the events recorded in the file sample analysis report.

In one alternate exemplary embodiment, the method 400 illustrated in FIG. 4 further comprises optionally disinfecting, through the scanner 126, the remote devices by reversing sequence of the events seen in the file sample analysis report, if the infections in the remote devices does not involve a ransomware.

In another alternate exemplary embodiment, the step of reversing the sequence of the events seen in the file sample analysis report further comprises firstly performing, through the scanner 126, the removal of the newly added registry keys, deleting the dropped files, the termination of processes created by the samples, and the shutting down of network services started by the executable file sample 112, and secondly performing, thorough the scanner 126, the removal of the scheduled tasks and the associated files.

In yet another alternate exemplary embodiment, the step of further checking on the conditions related with the computing device 103 or the other remote devices comprises checking, by the scanner 126, if the computing device 102 or the remote devices have the registry modifications or if the computing device 102 or the remote devices have the executable file sample 112 in their respective file subsystems.

In yet another alternate exemplary embodiment, the step 414 of generating, through the file sample analysis generator 120, the file sample analysis report based on the series of events comprises downloading, through the file sample analysis report generator 120, the file sample analysis report before the virtual machine 102 is shut down by the virtual machine (VM) controller 124, upon completion of the analysis timeout.

Figure 5:
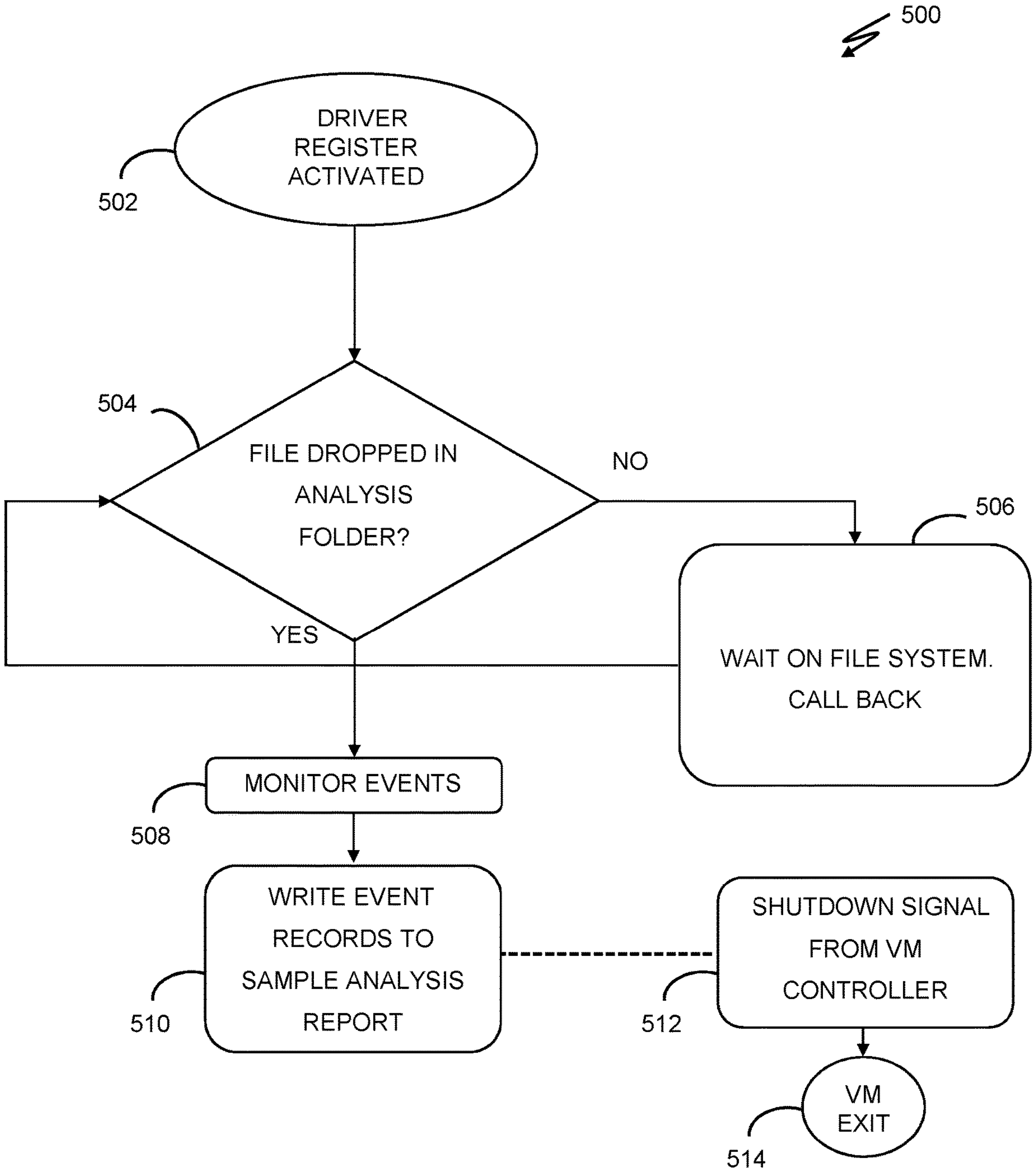
FIG. 5 depicts an example method of operation of a driver register during the detection and the on-demand disinfection of the remote devices, in accordance with one exemplary embodiment of the present disclosure.

FIG. 5 depicts an example method 500 of operation of the driver register 116 during the detection and the on-demand disinfection of the remote devices, in accordance with one exemplary embodiment of the present disclosure. The driver register 116 is an important component of the system 100 and is configured to register the series of kernel call backs, in order to enable the driver register 116 to monitor process, registry, filesystem, and network related activities. Any such activity is intercepted by these call backs and the driver register 116 is configured to analyze the event to understand the nature of the activity, the parameters passed to API calls, and the event classifier subsystem. The driver register 116 is configured to keep the record of all events from the executable file sample 112 in the file sample analysis report. The file sample analysis report is sent as an input to the scanner 126, which uses the file sample analysis report to scan the remote systems to detect the signs of infection due to the executable file sample 112. The virtual machine 102 or the virtual machine inside which the analysis is performed and in turn the driver register module 116 are started by the virtual machine controller script 124. The virtual machine controller script module 124 is basically a python script that receives samples from the system 100, starts the virtual machine 102 and the driver register module 116. The VM controller 124 then uploads the executable file sample 112 onto the virtual machine 102. Once the analysis timeout is over the VM controller 124 downloads the file sample analysis report and shuts down the virtual machine 102. The VM controller 124 ensures that every time the virtual machine is started for the new analysis the virtual machine comes up in the clean state.

The example method 500 of operation of the driver register 116 starts at step 502 and ends at step 514. At step 502, the example method 500 comprises initially activating the driver register 116. At step 504, the example method 500 further comprises detecting if the executable file sample 112 is dropped in an analysis folder or not. If the executable file sample 112 is not dropped in the analysis folder, the example method 500 further comprises initiating action of waiting on filesystem call back signal, at step 506. If the executable file sample 112 is dropped in the analysis folder, the example method 500 further comprises monitoring the events related with the executable file sample 112, at step 508. At step 510, the example method 500 further comprises initiating action of writing event records to the file sample analysis report. At step 512, the example method 500 further comprises sending a shutdown signal through the VM controller 124 to the virtual machine 102 inside which the analysis has been carried out. At step 514, the method further comprises enabling the virtual machine 102 to shut down, through the VM controller 124.

Figure 6:
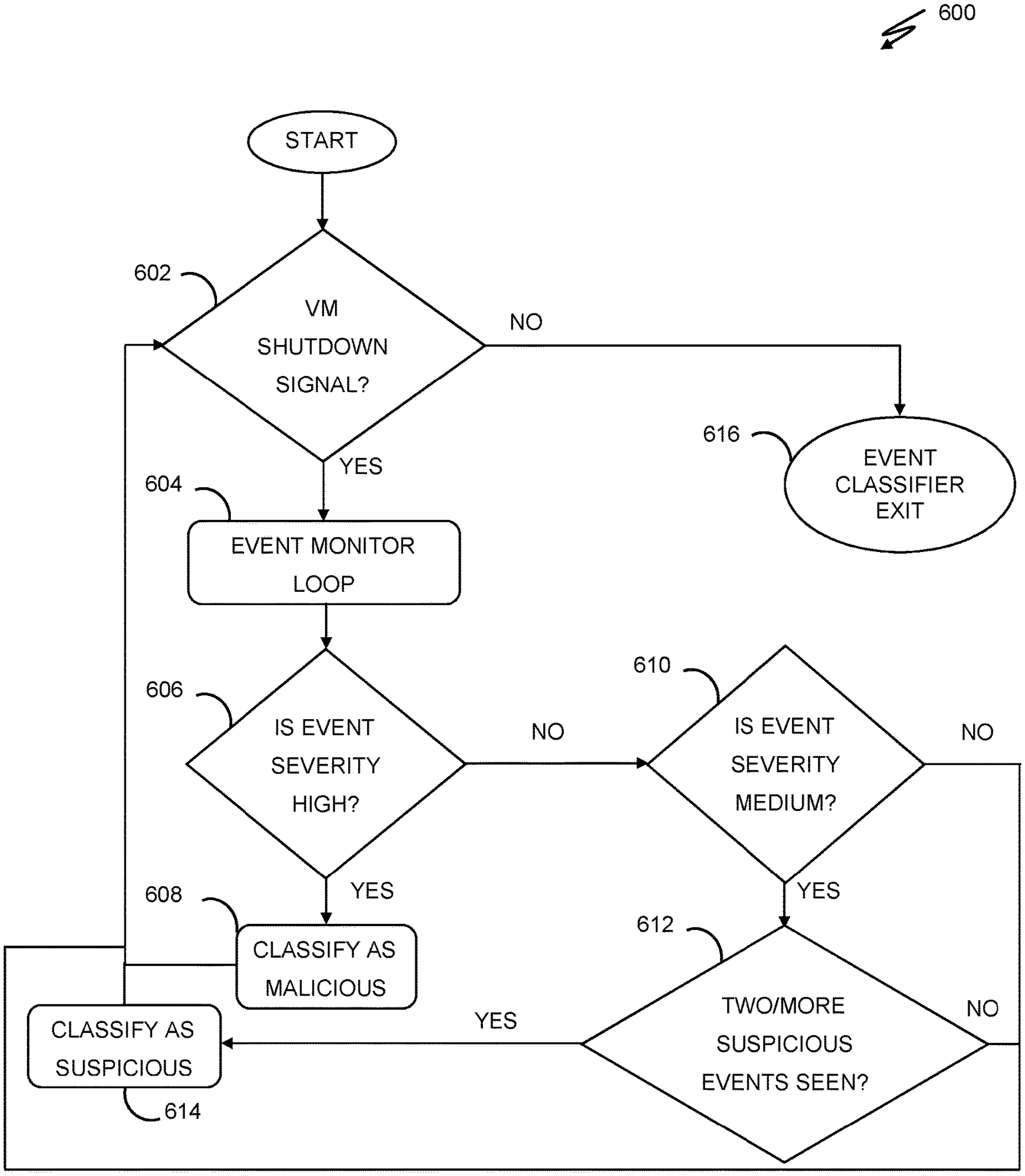
FIG. 6 depicts an example method of operation of an event classifier during the detection and the on-demand disinfection of the remote devices, in accordance with another exemplary embodiment of the present disclosure.

FIG. 6 depicts an example method 600 of operation of the event classifier 118 during the detection and the on-demand disinfection of the remote devices, in accordance with another exemplary embodiment of the present disclosure. The event classifier 118 is a part of the driver register 116 within the system 100. The event classifier 118 is configured to monitor the incoming events received by the driver register 116, and classify the executable file sample 112 under analysis as "Malicious", "Suspicious", or "Clean". The classification process is initiated by the event classifier 118, by assuming that the executable file sample 112 received by the computing device 103 is clean.

The following section of events listed below are treated as "MALICIOUS" or "SUSPICIOUS" by the event classifier 118.

- PROCESS events: These are events or activity monitored by a process monitoring subsystem of the event classifier 118 within the driver register 116, using registered kernel call backs. Examples of a malicious process event is connecting to a process with VM_WRITE permissions, launching a process from the TEMP folder, terminating a critical process like an Anti-Virus process etc. Examples of suspicious events are connecting to a process with VM_READ permissions, starting of a process from a standard windows path etc.
- REGISTRY events: These are events monitored by a registry monitoring subsystem of the event classifier 118 within the driver register 116. Any registry related activity is monitored by this subsystem using registered kernel call backs. Examples of malicious registry events are creating a Run key, creating a Win logon key, creating Run Once key, modifying keys related to Antivirus engines or other security software etc. Examples of suspicious events are creating registry keys which does not affect overall system operation, modifying non-critical keys etc.
- FILESYSTEM events: These are events monitored by the registry monitoring subsystem within the driver register 116. Any registry related activity is monitored by this subsystem using registered kernel call backs. Examples of malicious filesystem events are creating files under the TEMP folder, creating files under critical windows folder, creating files under the Startup folder etc. Examples of suspicious filesystem events are creating non executable files.
- NETWORK events: These are events monitored by a network monitoring subsystem of the event classifier 118 within the driver register 116. The network monitoring subsystem registers with Windows Filtering Platform layer to obtain information on outgoing TCP/UDP sessions, the associated process and executable file path. It is common for applications to start services listening on a TCP/UDP port or start process that makes outgoing connections. All network activity is marked as suspicious except when any executable service or process runs from paths like the Desktop folder, etc.
- TASKSCHEDULING events: These are events monitored by the process monitoring subsystem within the driver register 116. Any task scheduling related activity is monitored by this subsystem using the registered kernel call backs. All task scheduling activity is treated as malicious.

The example method 600 of FIG. 6 starts at step 602 and ends at step 616. At step 602, the example method 600 comprises of detecting if the VM shutdown signal is received by the virtual machine 102. At step 604, if the VM shutdown signal is received by the virtual machine 102, the event classifier 118 is configured to enable an event monitor loop to monitor the events related with the executable file sample 112. At step 606, the example method 600 further comprises detecting if the severity of the detected event is high or not. If the severity of the detected event is high, at step 608, the example method 600 further comprises classifying the executable file sample 112 as "MALICIOUS". But if the severity of the detected event is not high, at step 610, the example method 600 further comprises detecting if the severity of the detected event is medium or not. If the severity of the event is medium, at step 612, the example method 600 further comprises determining if there are two or more than two suspicious events seen. If there are two or more suspicious events seen, at step 614, the example method 600 further comprises classifying the executable file sample 112 as "SUSPICIOUS". If in a condition where either the severity of the detected event is not medium, or even if the severity of the event is medium but there have been no two or more than two suspicious events seen, the operational flow of the example method 600 again starts from the step 602. Lastly, if the VM shutdown signal is not received by the virtual machine 102 at the step 602, the method 600 further comprises exiting the operation of the event classifier module 118.

Figure 7:
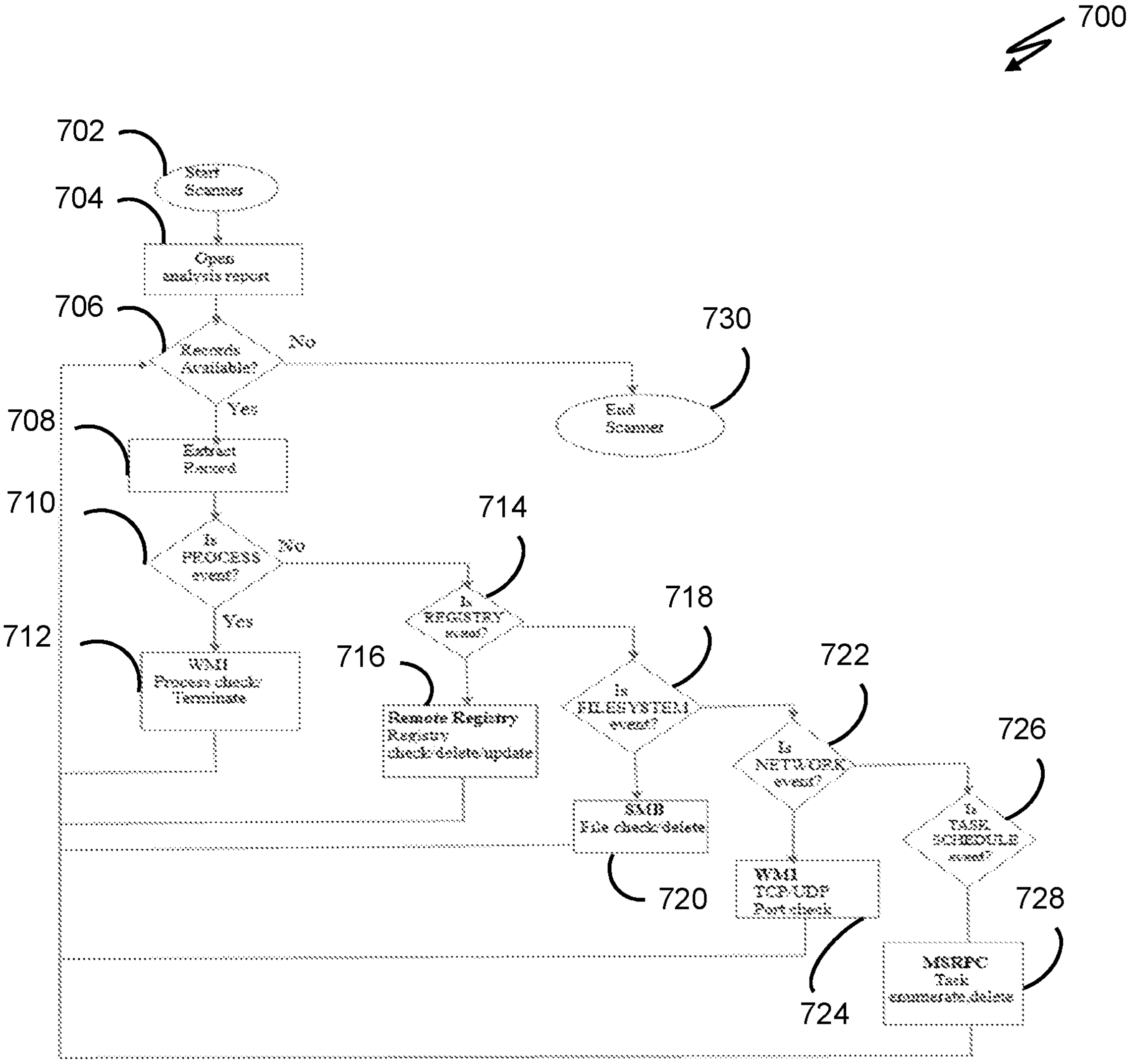
FIG. 7 depicts an example method of operation of a scanner during the detection and the on-demand disinfection of the remote devices, in accordance with yet another exemplary embodiment of the present disclosure.

FIG. 7 depicts an example method 700 of operation of the scanner 126 during the detection and the on-demand disinfection of the remote devices, in accordance with yet another exemplary embodiment of the present disclosure. Upon completion of the analysis of the executable file sample 112 and the event classifier 118 has marked the executable file sample 112 as "MALICIOUS" or "SUSPICIOUS", the file sample analysis report is generated which contains records of all the events generated by the executable file sample 112. These events could be a mix of the process, the network, the filesystem, the registry, and the task scheduling. The scanner 126 is a python module which ingest this file sample analysis report, and configured to perform remote scanning of the systems over the remote internal network to detect the signs of the events as recorded in the file sample analysis report. The presence of any of these events recorded in the file sample analysis report is an indicator that the scanned system or the computing device 103, or the remote devices have been infected. In most cases, if the infection does not involve the ransomware, the scanner 126 is configured to optionally disinfect the system 100 by reversing the sequence of the events as seen in the file sample analysis report.

The method 700 starts at step 702 and ends at step 730. At step 702, the scanner module 126 is initiated. At step 704, the example method 700 further comprises opening the file sample analysis report related to the executable file sample 112. At step 706, the example method 700 further comprises detecting if there are any records related to the file sample analysis report available. If it is determined that the records related to the file sample analysis report are available, at step 708, the example method 700 further comprises extracting the records out from the file sample analysis report. The scanner 126 then goes through each record in the file sample analysis report and performs a remote scan. At step 710, the event classifier 118 is configured to detect if the event is the "PROCESS" event. At step 712, the example method 700 further comprises utilizing, by the scanner 126, Windows Management Instrumentation (WMI) protocol to enumerate processes on the scanned virtual machine. The scanner 126 then further checks that if any characteristic described by the parsed record is seen in the enumerated process. This could be a new process created, a process that was stopped or a process against which injection techniques were used. If at step 714, it is detected that the event is not the process event, but the "REGISTRY" event. Upon detection of the event as the "REGISTRY" event, at step 716, the example method 700 further comprises enabling the scanner 126 to utilize "Remote Registry DCOM service" to analyse the registry on the scanned VM to detect changes made to it. At step 718, the method 700 further comprises assessing if the event is the "FILESYSTEM" event. If the event is the filesystem event, at step 720, the method 700 further comprises using, by the scanner 126, Server Message Block (SMB) protocol to check the filesystem on the scanned VM to detect changes made to it due to the executable file sample 112. At step 722, the method 700 further comprises assessing if the event is the "NETWORK" event. If the event is the network event, at step 724, the method 700 further comprises using, by the scanner 126, the WMI protocol or Transmission Control Protocol (TCP) or User Datagram Protocol (UDP) port check protocol to check the network system on the scanned VM to detect changes made to it due to the executable file sample 112. At step 726, the method 600 further comprises assessing if the event is the "TASK SCHEDULE" event. If the event is the task schedule event, at step 728, the method 700 further comprises using, by the scanner 126, the Microsoft Remote Procedure Call (MSRPC) protocol to check the task schedule on the scanned VM to detect changes made to it due to the executable file sample 112. If at the step 706, it is determined that there are no records available in the file sample analysis report, the operation of scanner module ends at step 730.

In some embodiments, the nature of the analyzed file sample is determined based on a proprietary classifier, using the multi-model approach. The system 100 of the present invention utilizes the multi-model approach for making execution of the process of the detection and the on-spot treatment of the infections caused due to the executable file sample 112 significantly faster and easier. Enough evidence with respect to the executable file sample 112 is collected, to understand the malicious nature of the executable file sample 112 under analysis. The system 100 of the present invention is configured to remotely scan the other devices for signs of infections and clean the machines if infected by the executable file sample 112. The system 100 of the present invention is configured to determine malicious nature of the executable file sample 112, and instantly scan the computing device 103 or the remote devices infected due to the executable file sample, in order to fix the computing device 103 or the remote devices. The system 100 of the present invention is configured to perform dynamic analysis of the executable file sample 112.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Although the foregoing embodiments have been described in some detail for purposes of clarity of understanding, the invention is not limited to the details provided. There are many alternative ways of implementing the invention. The disclosed embodiments are illustrative and not restrictive.

Although the invention has been explained in relation to its preferred embodiment, it is to be understood that many other possible modifications and variations can be made without departing from the spirit and scope of the invention as hereinafter claimed.

What is claimed:

1. A computer-based system for detection and on-demand disinfection of remote devices, the system comprising:

a computing device configured to-receive an executable file sample;

a communication device configured to-extract the executable file sample from the computing device, and analyze the executable file sample; and a virtual machine (VM) controller coupled to the computing device, the communication device, and one or more processors, the one or more processors having instructions stored thereon which, when executed by the one or more processors causes the one or more processors to enable the VM controller to perform operations, the operations comprising:

evaluating, through the communication device, if the executable file sample received has been analyzed before;

running a virtual machine to check status of the executable file sample;

activating a driver register to enable a file monitor to monitor a series of events occurring on the virtual machine, due to running of the virtual machine;

generating, through a file sample analysis generator, a file sample analysis report based on the series of events; and upon generation of the file sample analysis report, classifying, through an event classifier, the executable file sample based on the series of events and the file sample analysis report, wherein if the executable file sample is classified as malicious in nature, a scanner is activated to scan the computing device or the remote devices over a remote internal network based on the file sample analysis report, to detect signs of infection in the computing device or the remote devices due to the executable file sample, and further check on conditions related with the computing device or the remote devices, wherein the scanner is configured to check if the computing device or the remote devices have registry modifications, or if the computing device or the remote devices have the executable file sample in their respective file subsystems.

2. The system of claim 1, wherein the series of events comprises a process activity, a registry activity, a filesystem activity, a task scheduling activity, and network related activities.

3. The system of claim 1, wherein the driver register is configured to register a series of kernel callbacks to enable the file monitor to monitor the series of events.

4. The system of claim 1, wherein the driver register is further configured to analyze the series of events to understand nature of each of the events, nature of parameters passed to API calls, and nature of the event classifier.

5. The system of claim 1, wherein the driver register is further configured to keep a record of each of the events occurring on the virtual machine due to the executable file sample in the file sample analysis report.

6. The system of claim 1, wherein the VM controller is configured to upload the executable file sample onto the virtual machine.

7. The system of claim 1, wherein the file sample analysis report generator is configured to download the file sample analysis report before the virtual machine is shut down by the VM controller upon completion of analysis timeout.

8. The system of claim 1, wherein the remote devices are, but not restricted to, virtual devices, physical devices, remote network devices, or any other devices.

9. The system of claim 1, wherein the scanner is further configured to ingest the file sample analysis report, and perform remote scanning of the remote machines over the remote internal network, to detect signs of the events recorded in the file sample analysis report.

10. The system of claim 1, wherein the scanner is further configured to optionally disinfect the remote machines by reversing sequence of the series of events seen in the file sample analysis report, if the infections in the remote machines do not involve a ransomware.

11. The system of claim 10, wherein the reversing sequence of the series of events seen in the file sample analysis report comprises removing newly added registry keys, deleting dropped files, terminating processes created by file samples, shutting down network services started by the executable file sample, and removing scheduled tasks and associated file.

12. A computer-implemented method of performing detection and on-demand disinfection of remote devices by a VM controller executed by one or more processors, the computer-implemented method comprising:

receiving, through a computing device, an executable file sample;

extracting, through a communication device, the executable file sample from the computing device;

evaluating, through the communication device, if the executable file sample received has been analyzed before;

analyzing, through the communication device, the executable file sample;

running, through the VM controller, a virtual machine to check status of the executable file sample;

activating, through the VM controller, a driver register for enabling a file monitor to monitor a series of events occurring on the virtual machine, due to the running of the virtual machine;

generating, through a file sample analysis generator, a file sample analysis report based on the series of events; and upon generation of the file sample analysis report, classifying, through an event classifier, the executable file sample based on the series of events and the file sample analysis report, wherein if the executable file sample is classified as malicious in nature, activating a scanner to scan the computing device or the remote devices over a remote internal network based on the file sample analysis report, to detect signs of infection in the computing device or the remote devices due to the executable file sample, and further check on conditions related with the computing device or the remote devices, wherein the action of the further check on the conditions related with the computing device or the remote devices comprises checking, by the scanner, if the computing device or the remote devices have registry modifications, or if the computing device or the remote devices have the executable file sample in their respective file subsystems.

13. The method of claim 12, wherein the step of activating, through the VM controller, the driver register for enabling the file monitor to monitor the series of events occurring on the virtual machine, due to running of the virtual machine comprises:

registering, through the driver register, a series of kernel callbacks to enable the file monitor to monitor the series of events.

14. The method of claim 12, wherein the step of activating the scanner to scan the computing device or the remote devices over the remote internal network based on the file sample analysis report comprises:

uploading, through the VM controller, the executable file sample onto the virtual machine for analysis; and upon completion of analysis timeout, causing the virtual machine to shut down.

15. The method of claim 12, wherein the step of scanning, through the scanner, the computing device or the remote devices over the remote internal network to detect the signs of infection in the computing device or the remote devices due to the executable file sample comprises:

ingesting, through the scanner, the file sample analysis report; and performing, through the scanner, remote scanning of the computing device or the remote devices over the remote internal network, to detect signs of the events recorded in the file sample analysis report.

16. The method of claim 12, wherein the step of generating, through the file sample analysis generator, the file sample analysis report based on the series of events further comprises:

downloading, through the file sample analysis report generator, the file sample analysis report, before the virtual machine is shut-down by the VM controller, upon completion of analysis timeout.

17. The method of claim 13, further comprising:

analyzing, through the driver register, the series of events to understand nature of each of the series of events, nature of parameters passed to API calls, and nature of the event classifier.

18. The method of claim 12, further comprising:

storing, through the driver register, a record of each of the series of events from the executable file sample in the file sample analysis report.

19. The method of claim 15, further comprising:

optionally disinfecting, through the scanner, the remote devices by reversing sequences of the series of events seen in the file sample analysis report, if the infections in the remote devices does not involve a ransomware.

20. The method of claim 19, wherein the step of reversing sequences of the series of events seen in the file sample analysis report, if the infections in the remote devices does not involve a ransomware further comprises:

performing, through the scanner, removal of newly added registry keys, deleting dropped files, termination of processes created by file samples, and shutting down of network services started by the executable file sample; and performing, through the scanner, removal of scheduled tasks and associated files.

21. The method of claim 12, wherein the remote devices are, but not restricted to, virtual devices, physical devices, remote network devices, or any other devices.

22. A non-transitory computer-readable storage medium coupled to one or more processors and having instructions stored thereon which, when executed by the one or more processors, cause the one or more processors to enable the VM controller to perform operations which are executed by the one or more processors, the operations comprising:

receiving, through a computing device, an executable file sample;

extracting, through a communication device, the executable file sample from the computing device;

evaluating, through the communication device, if the executable file sample received has been analyzed before;

analyzing, through the communication device, the executable file sample;

running, through the VM controller, a virtual machine to check status of the executable file sample;

activating, through the VM controller, a driver register for enabling a file monitor to monitor a series of events occurring on the virtual machine, due to the running of the virtual machine;

generating, through a file sample analysis generator, a file sample analysis report based on the series of events; and upon generation of the file sample analysis report, classifying, through an event classifier, the executable file sample based on the series of events and the file sample analysis report, wherein if the executable file sample is classified as malicious in nature, activating a scanner to scan the computing device or the remote devices over a remote internal network based on the file sample analysis report, to detect signs of infection in the computing device or the remote devices due to the executable file sample, and further check on conditions related with the computing device or the remote devices, wherein the action of the further check on the conditions related with the computing device or the remote devices comprises checking, by the scanner, if the computing device or the remote devices have registry modifications, or if the computing device or the remote devices have the executable file sample in their respective file subsystems.

* * * * *